United States Patent Office 2,908,561
Patented Oct. 13, 1959

2,908,561
PROCESSES FOR PRODUCING PHOSPHATIC FERTILIZERS

James E. Seymour, Collinsville, Ill., assignor, by mesne assignments, to Central Farmers Fertilizer Company, Chicago, Ill., a corporation of Illinois No Drawing. Application March 29, 1955
Serial No. 497,789

2 Claims. (Cl. 71—33)

This invention relates to the production of phosphatic fertilizers and particularly to an improved method for producing enriched superphosphates.

Superphosphates have long been produced, as by acidulation of phosphate rock, and are commercially available as "normal" superphosphates, usually analyzing 16–20% available $P_2O_5$, and "triple" superphosphates, usually analyzing 45–50% available $P_2O_5$. By the conventional methods, the acidulation reaction mixture is subjected to a "den" treatment, the resulting green superphosphate is then broken up, and the product is cured in pile for from several days to several weeks. The finally cured product is then preferably granulated before bagging. The green or "den" superphosphate is not fully reacted. Acidulation continues during pile curing. And, even after pile curing, the product contains appreciable proportions of free moisture and acid. Such high moisture and acid content is highly disadvantageous, both from the standpoint of economics of the process and from the standpoint of physical condition of the product.

The object of the present invention is to provide an improved process for producing enriched fertilizers from green superphosphate or cured superphosphate, the term "superphosphate" including both the normal and the triple or "enriched" grades.

Another object is to provide an improved process for reducing the free moisture and acidity of green and cured superphosphates and producing an enriched product of improved physical condition.

I have discovered that the foregoing objects can be achieved by thoroughly mixing with the superphosphate a metaphosphate selected from the group consisting of calcium metaphosphate, potassium metaphosphate and sodium metaphosphate, to provide a composition in which the metaphosphate constitutes 10–90% by weight, and then pile curing the resulting mixture for from about 5 days to about two months, depending upon the percentage of moisture and free acidity in the superphosphate employed.

Conventionally produced superphosphates contain in excess of 1% by weight free acid measured in terms of sulfuric acid, even after pile curing. The moisture content of conventionally produced superphosphates ranges from about 4–12% by weight, for the cured product, to as much as 6–13% by weight for the green product. I have discovered that such acid and moisture contents are effective to cause hydrolysis of the metaphosphates hereinbefore mentioned, within the curing periods stated, according to the following typical equation:

$$Ca(PO_3)_2 + 3H_2O \rightarrow CaH_4(PO_4)_2 \cdot H_2O$$

Thus, the metaphosphate is converted to the corresponding primary orthophosphate, the free moisture content of the superphosphate being consumed by the hydrolysis reaction. Since the free moisture and acid in the superphosphate is present even after the acidulation reaction employed to produce the same has, for practical purposes, gone to completion, and since the ingredients for superphosphate production are usually proportioned to promote complete reaction, with the acidity of the end product as low as possible, it is surprising that the metaphosphate is hydrolyzed merely by intimate contact with the superphosphate in the pile. Yet the hydrolysis occurs in my process, in many examples going substantially to completion in curing periods as short as 5 days. While the phenomenon is not completely understood, it appears that a free acid content of at least 1% by weight of the superphosphate is effective to catalytically promote hydrolysis of the metaphosphate, if the proportion of the metaphosphate does not exceed 90% by weight of the metaphosphate-superphosphate mixture, at the temperatures existing in the pile, usually about 165–175° F. It further appears that the water content of the superphosphate is not so tightly bound as to be unavailable to the hydrolysis reaction.

The metaphosphate employed should be uniformly granular and of such particle size that all will pass an 8 mesh screen. Particularly good results are obtained when the metaphosphate will all pass a 35 mesh screen. The superphosphate should be in particulate form. If green superphosphate is employed, it may be in the form excavated from the den. If cured superphosphate is used it should be at least as fine as 8 mesh.

The metaphosphate and superphosphate may be blended and intimately mixed in any suitable conventional mixing apparatus capable of producing a substantially uniform mixture. Such mixture is then conveyed to pile storage in any of the manners now in use in conventional superphosphate production.

The following examples are illustrative:

Example 1

Ten parts by weight 20 mesh calcium metaphosphate was uniformly mixed with 90 parts by weight 20 mesh cured normal superphosphate having a free moisture content of 8%. A small portion of the resulting mixture was then stored at a temperature maintained substantially constant at 70° F. Storage was in a sealed space preventing both the loss of moisture to the atmosphere and the gain of moisture from without the sample.

Analyses of the product were made 1 day, 4 days, 14 days and 34 days after manufacture, as follows:

|  | 1 day | 4 days | 14 days | 34 days |
|---|---|---|---|---|
|  | Percent | Percent | Percent | Percent |
| Moisture | 7.61 | 7.04 | 5.87 | 5.25 |
| Total $P_2O_5$ | 26.40 | 26.95 | 26.50 | 26.35 |
| Citrate Insoluble $P_2O_5$ | .15 | .20 | .22 | .30 |
| Available $P_2O_5$ | 26.25 | 26.75 | 26.28 | 26.05 |
| Water Soluble $P_2O_5$ | 18.40 | 18.85 | 20.65 | 21.40 |
| Acidity to Methyl Orange as $H_2SO_4$ | 3.84 | 2.95 | 2.40 | 2.40 |

The remainder of the mixture was stored in a pile. Analyses of the product 1 day, 4 days, 14 days and 34 days after manufacture are as follows:

|  | 1 day | 4 days | 14 days | 34 days |
|---|---|---|---|---|
|  | Percent | Percent | Percent | Percent |
| Moisture | 5.88 | 4.90 | 4.99 | 3.63 |
| Total $P_2O_5$ | 27.00 | 26.80 | 26.55 | 27.00 |
| Citrate Insoluble $P_2O_5$ | .37 | .12 | .15 | .30 |
| Available $P_2O_5$ | 26.63 | 26.68 | 26.40 | 26.70 |
| Water Soluble $P_2O_5$ | 21.20 |  | 23.00 |  |
| Acidity to Methyl Orange as $H_2SO_4$ | 3.36 | 2.28 | 2.04 | 1.86 |

The pile temperature was approximately 165° F.

Example 2

Equal parts by weight of 20 mesh calcium metaphosphate and 20 mesh normal superphosphate were thoroughly mixed. The normal superphosphate analyzed 18.5% available $P_2O_5$ and 8% moisture. A portion of the mixture was stored in an air-tight chamber and maintained at 70° F. Analyses of the product 1, 4, 14 and 34 days after mixing are as follows:

|  | 1 day | 4 days | 14 days | 34 days |
|---|---|---|---|---|
|  | Percent | Percent | Percent | Percent |
| Moisture | 3.86 | 3.44 | 3.61 | 1.79 |
| Total $P_2O_5$ | 43.75 | 42.75 | 43.20 | 46.35 |
| Citrate Insoluble $P_2O_5$ | 2.35 | 1.32 | .70 | .75 |
| Available $P_2O_5$ | 41.40 | 41.43 | 42.50 | 45.60 |
| Water Soluble $P_2O_5$ | 11.40 | 12.15 | 12.85 | 13.85 |
| Acidity to Methyl Orange as $H_2SO_4$ |  | 1.20 |  | 1.14 |

The remainder of the mixture was pile cured. Analyses of the product 1, 4, 14 and 34 days after mixing are as follows:

|  | 1 day | 4 days | 14 days | 34 days |
|---|---|---|---|---|
|  | Percent | Percent | Percent | Percent |
| Moisture | 1.98 | 1.43 | .68 | .68 |
| Total $P_2O_5$ | 45.85 | 44.15 | 44.00 | 45.25 |
| Citrate Insoluble $P_2O_5$ | .70 | .77 | .60 | .75 |
| Available $P_2O_5$ | 45.15 | 43.38 | 43.40 | 44.50 |
| Water Soluble $P_2O_5$ | 14.50 | 16.80 | 16.85 | 18.00 |
| Acidity to Methyl Orange as $H_2SO_4$ | .96 |  |  | .96 |

Example 3

Seventy parts by weight of 20 mesh calcium metaphosphate and 30 parts by weight 20 mesh normal superphosphate were thoroughly mixed. The normal superphosphate analyzed 18.5% available $P_2O_5$ and 8% free moisture. A small portion of the mixture was stored in a sealed container and maintained at 70° F. throughout the storage period. Analyses 1, 4, 14 and 34 days after mixing are as follows:

|  | 1 day | 4 days | 14 days | 34 days |
|---|---|---|---|---|
|  | Percent | Percent | Percent | Percent |
| Moisture | 2.18 | 1.96 | 1.40 | 1.16 |
| Total $P_2O_5$ | 52.20 | 51.75 | 52.50 | 52.50 |
| Citrate Insoluble $P_2O_5$ | 1.22 | 2.42 | 1.02 | .90 |
| Available $P_2O_5$ | 50.98 | 49.33 | 51.84 | 51.60 |
| Water Soluble $P_2O_5$ | 7.20 | 7.25 | 7.75 | 9.75 |
| Acidity to Methyl Orange as $H_2SO_4$ |  | .84 | .72 | .72 |

The remainder of the mixture was stored in a pile. Analyses of the product 1, 4, 14 and 28 days after mixing are:

|  | 1 day | 4 days | 14 days | 28 days |
|---|---|---|---|---|
|  | Percent | Percent | Percent | Percent |
| Moisture | 1.08 | .66 | .39 | .32 |
| Total $P_2O_5$ | 53.15 | 52.15 | 52.15 | 52.35 |
| Citrate Insoluble $P_2O_5$ | 2.72 | .92 | .75 | .80 |
| Available $P_2O_5$ | 50.43 | 51.23 | 51.40 | 51.55 |
| Water Soluble $P_2O_5$ | 10.15 | 10.15 | 10.55 | 12.30 |
| Acidity to Methyl Orange as $H_2SO_4$ | .36 | .36 | .24 | .60 |

Example 4

Ninety parts by weight 20 mesh cured triple superphosphate containing 48.7% $P_2O_5$ and 5% free moisture and 2.7% free acid was intimately mixed with 10 parts by weight of 20 mesh calcium metaphosphate. A small portion of the mixture was stored in an airtight container at room temperature and analyzed 15 and 29 days after manufacture:

|  | 15 days | 29 days |
|---|---|---|
|  | Percent | Percent |
| Moisture | 4.13 | 1.79 |
| Total $P_2O_5$ | 49.35 | 50.25 |
| Citrate Insoluble $P_2O_5$ | .62 | .50 |
| Available $P_2O_5$ | 48.73 | 49.75 |
| Water Soluble $P_2O_5$ |  | 41.00 |
| Acidity to Methyl Orange as $H_2SO_4$ | 2.35 | 2.28 |

The remainder was pile cured. Analyses 15 and 29 days after mixing were:

|  | 15 days | 29 days |
|---|---|---|
|  | Percent | Percent |
| Moisture | 4.04 | .86 |
| Total $P_2O_5$ | 49.70 | 49.70 |
| Citrate Insoluble $P_2O_5$ | .65 | .52 |
| Available $P_2O_5$ | 49.05 | 49.18 |
| Water Soluble $P_2O_5$ | 43.10 | 43.40 |
| Acidity to Methyl Orange as $H_2SO_4$ | 2.04 | 1.92 |

Example 5

Forty parts by weight calcium metaphosphate was intimately mixed with 60 parts by weight of 20 mesh cured triple superphosphate containing 51.5% $P_2O_5$, 5% free moisture and 2.5% free acid. A small portion of the mixture was stored at room temperature in a sealed container. Analyses 15 and 29 days after mixing were:

|  | 15 days | 29 days |
|---|---|---|
|  | Percent | Percent |
| Moisture | 2.03 | .78 |
| Total $P_2O_5$ | 56.25 | 56.70 |
| Citrate Insoluble $P_2O_5$ | 1.20 | .70 |
| Available $P_2O_5$ | 55.05 | 56.00 |
| Water Soluble $P_2O_5$ | 31.35 |  |
| Acidity to Methyl Orange as $H_2SO_4$ | 1.44 | .72 |

The remainder of the mixture was pile cured. Analyses 15 and 29 days after mixing were:

|  | 15 days | 29 days |
|---|---|---|
|  | Percent | Percent |
| Moisture | 2.44 | .27 |
| Total $P_2O_5$ | 56.15 | 56.70 |
| Citrate Insoluble $P_2O_5$ | 1.40 | .80 |
| Available $P_2O_5$ | 54.75 | 55.90 |
| Water Soluble $P_2O_5$ | 32.65 |  |
| Acidity to Methyl Orange as $H_2SO_4$ | 1.22 | .72 |

I have found that potassium metaphosphate and sodium metaphosphate behave correspondingly to calcium metaphosphate when employed in accordance with the present invention. The following examples are typical:

Example 6

Ninety parts of potassium metaphosphate were blended and thoroughly mixed with 10 parts by weight 20 mesh cured normal superphosphate. The superphosphate analyzed 20% available $P_2O_5$, 8% free moisture and 2% free acid. The mixture was stored at 70° F. in a sealed container. After 19 and 34 days, the product analyzed:

|  | 19 Days | 34 Days |
|---|---|---|
|  | Percent | Percent |
| Moisture | .45 | .16 |
| Total $P_2O_5$ | 57.25 | 57.25 |
| Citrate Insoluble $P_2O_5$ | 2.22 | .12 |
| Available $P_2O_5$ | 55.03 | 57.13 |
| Water Soluble $P_2O_5$ | 41.60 |  |
| Potash as $K_2O$ | 35.23 | 35.23 |
| Acidity to Methyl Orange as $H_2SO_4$ | .36 | .36 |

Example 7

Equal parts by weight of sodium metaphosphate and 20 mesh cured normal superphosphate were blended and thoroughly mixed. The superphosphate analyzed 20% available $P_2O_5$, 8% free moisture and 2% free acid. The mixture was stored at 70° F. in a sealed container. Analysis after 35 days was:

| | Percent |
|---|---|
| Moisture | 1.99 |
| Total $P_2O_5$ | 48.05 |
| Citrate Insoluble $P_2O_5$ | None |
| Available $P_2O_5$ | 48.05 |
| Basicity | 1.20 |

From the foregoing examples, it will be understood that the extent of hydrolysis depends upon the amount of available water in the superphosphate employed and that, conversely, the greatest improvement in the physical properties of the product arise when the metaphosphate is employed in at least the stoichiometric proportion required for reaction with the water content of the superphosphate.

The present process has obvious commercial advantages. Thus, from Example 5, it will be seen that superphosphates can be enriched by nearly 5% available $P_2O_5$ while decreasing the free moisture to a negligible amount. When it is realized that the metaphosphate is less expensive per unit of $P_2O_5$ than is triple superphosphate, the economic advantage is obvious. Also, the advantage of production of PK grade products such as that of Example 6 is of obvious importance.

I claim:

1. A method for producing a phosphorus enriched superphosphate comprising intimately mixing comminuted metaphosphate selected from the group consisting of calcium metaphosphate, potasisum metaphosphate and sodium metaphosphate, and comminuted superphosphate to form a mixture wherein the metaphosphate:superphosphate weight ratio is between about 1:9 and 9:1, and then pile curing said mixture for a period of at least 5 days, said superphosphate having a free acid content of at least 1.0% and a free moisture content with a range of from about 4.0% to about 13.0%.

2. A method according to claim 1 wherein the metaphosphate is calcium metaphosphate and the free acid content of the superphosphate is at least 2.5%.

References Cited in the file of this patent

UNITED STATES PATENTS

| | | |
|---|---|---|
| 1,790,220 | Balz et al. | Jan. 27, 1931 |
| 2,064,979 | Kaselitz | Dec. 22, 1936 |
| 2,136,793 | Gabeler et al. | Nov. 15, 1938 |
| 2,165,948 | Taylor | July 11, 1939 |
| 2,288,418 | Partridge | June 30, 1942 |
| 2,739,886 | Facer | Mar. 27, 1956 |